C. S. LAWSON.
GAGE.
APPLICATION FILED NOV. 28, 1919.
1,386,006.
Patented Aug. 2, 1921.
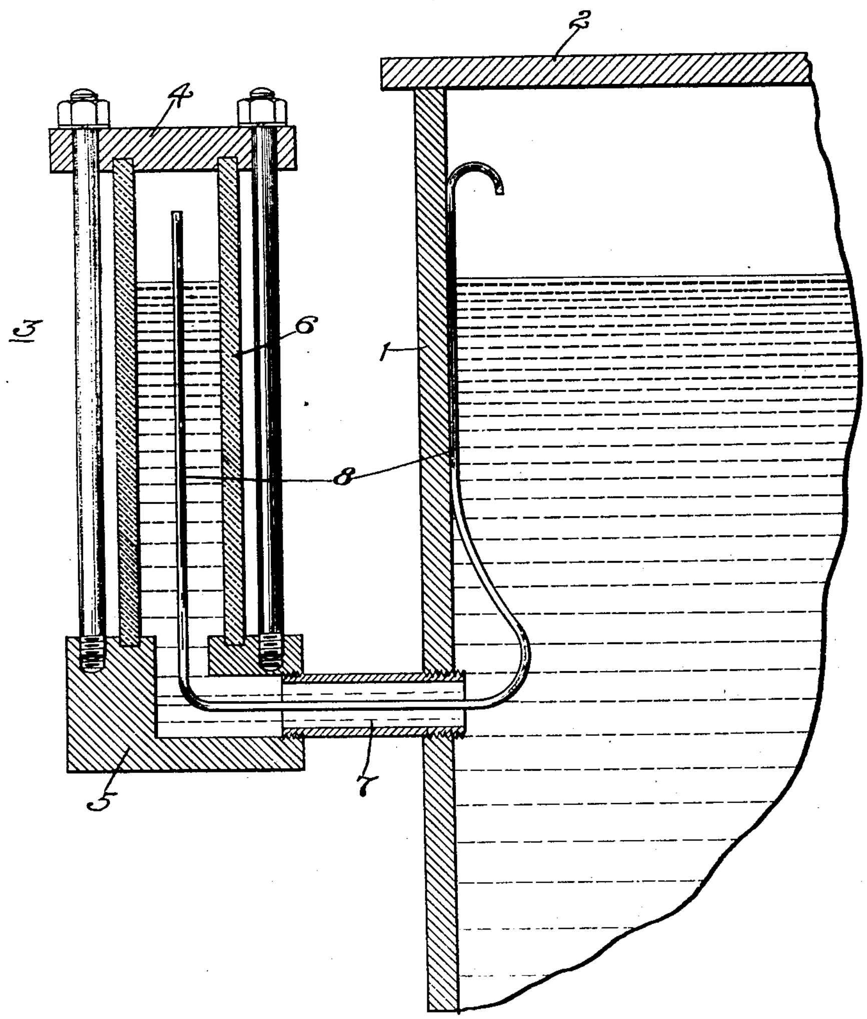
WITNESSES:
J.B. Merrill
a.a. Brand
INVENTOR
Charles S. Lawson
BY
Wesley G. Carr
ATTORNEY

UNITED STATES PATENT OFFICE.

CHARLES S. LAWSON, OF PITTSBURGH, PENNSYLVANIA, ASSIGNOR TO WESTINGHOUSE ELECTRIC & MANUFACTURING COMPANY, A CORPORATION OF PENNSYLVANIA.

GAGE.

1,386,006. Specification of Letters Patent. Patented Aug. 2, 1921.

Application filed November 28, 1919. Serial No. 340,976.

*To all whom it may concern:*

Be it known that I, CHARLES S. LAWSON, a citizen of the United States, and a resident of Pittsburgh, in the county of Allegheny and State of Pennsylvania, have invented a new and useful Improvement in Gages, of which the following is a specification.

My invention relates to gages for indicating the depths of liquids which are contained in closed vessels and it has particular relation to gages of the character which are employed to indicate the depth of the oil or insulating fluid in a transformer tank, the tank usually being but partially filled, and the air in the space above the oil level being, at times, under pressure.

The single figure of the accompanying drawing is a fragmentary elevational sectional view of a portion of a liquid-containing tank with a gage embodying my invention connected thereto.

Heretofore, it has been the usual practice to attach a liquid-indicating gage to a vessel of the character described through two connecting means, one of which established communication between the upper portions of the vessel and the gage and the other of which allowed the fluid to pass from the vessel into the bottom portion of the gage. This method of connecting the gage to the vessel insured the existence of equal air pressures in the tank and in the gage, thus rendering the indication substantially exact.

I find, however, that the difficulties experienced in tapping two pipe connections into the tank above referred to are considerable and afford a double chance of leakage. Moreover, the upper pipe connection, which is used to equalize the air pressures between the upper portions of the gage and the tank, must necessarily be air-tight, and therefore, an additional element of difficulty is introduced.

I find therefore that, by embodying, in one pipe connection, communicating means for both the air and the liquid contained in the vessel, most of the difficulty inherent in the use of a second communicating pipe is eliminated.

Referring now more particularly to the drawing, a portion 1 of a liquid-containing tank is shown as having a substantially air-tight cover 2 placed thereupon. A gage 3, comprising upper and lower closure members 4 and 5, respectively, and a transparent tubular member 6 positioned therebetween, is shown as connected to the vessel 1 by a pipe 7.

Positioned within the pipe 7, and affording communication between the upper portion of the tank and of the member 6, is a small tubular member 8 composed of such material that it may readily be bent into a desirable configuration. This tube is positioned in the manner shown and will be retained permanently in that position by reason of the particular shape into which it is bent.

By so constructing a gage with but one communicating means extending to the liquid-containing tank, the chance of leakage is reduced more than one-half, and the complete inclosure of the air-communicating means insures, in a simple and efficient manner, the equalization of the air pressures in the upper portions of the gage and of the tank.

The assembly of the gage above described is somewhat more simple than would be the case if two pipe connections were used. The tube 8 may be positioned as shown, and the gage thereafter mounted upon the side of the tank.

While I have shown but one embodiment of my invention, it will be apparent to those skilled in the art that many modifications may be made therein without departing from the spirit and scope of the appended claims.

I claim as my invention:

1. The combination with a vessel containing liquid and air, a device for indicating the level of the liquid therein, and a single connecting means between said device and said vessel having a passage therethrough, whereby said level may be indicated, irrespective of the pressure of the liquid and the air.

2. In combination with a vessel containing liquid and air, a device for indicating the level of the liquid therein, and a single connection between said device and said vessel, said connection embodying a plurality of passages whereby said level may be indicated, irrespective of the pressure of the liquid and the air.

3. In combination with a vessel containing liquid and air, a device for indicating the level of the liquid therein, said device comprising a liquid-containing member, a member connecting said last-named member to the vessel, and means passing through said connecting member for equalizing the air pressure in said vessel with that in said indicating device, whereby said level may be indicated, irrespective of the pressures of the liquid and the air.

4. In combination with a vessel containing liquid and air, a device for indicating the liquid level therein, said device comprising means embodying indicating mechanism, a connecting member for permitting the passage of liquid between the vessel and the device, and means positioned passing through the connecting member for connecting the air spaces in the vessel and in the device.

5. In combination with a vessel containing liquid and air, a device for indicating the liquid level therein, said device comprising means embodying indicating mechanism, a connecting member for permitting the passage of liquid between the vessel and the device, and means positioned within the connecting member but wholly unattached to said vessel for connecting the air spaces in the vessel and in the device.

6. In combination with a vessel containing liquid and air, a device for indicating the liquid level therein, said device comprising means embodying indicating mechanism, a connecting member permitting the passage of liquid between the vessel and the device, and means loosely positioned within the connecting member and comprising a tubular member for connecting the air spaces in the vessel and in the device.

7. In combination with a fluid-tight vessel containing liquid and air, a device for indicating the liquid level therein, said device comprising a fluid tight member provided with an indicating tube, a pipe connection between said member and the vessel, and a tubular member loosely positioned within said pipe connection for connecting the air space in the vessel with that in the indicating device.

In testimony whereof I have hereunto subscribed my name this 21st day of November, 1919.

CHARLES S. LAWSON.